United States Patent [19]

Walters

[11] 4,022,037
[45] May 10, 1977

[54] SHIELD LOCK ASSEMBLY

[75] Inventor: Russell W. Walters, Richmond, Ky.

[73] Assignee: BMR Security Products Corporation, Richmond, Ky.

[22] Filed: Aug. 21, 1975

[21] Appl. No.: 606,721

[52] U.S. Cl. .............................. 70/232; 70/DIG. 57
[51] Int. Cl.² ......................................... F16B 41/00
[58] Field of Search ............ 70/158, 160, 163, 164, 70/166, 170, 229–232, DIG. 57, 14, 57, 416, 417, 424, 426, 428, 430; 109/59–62, 74; 248/203

[56] References Cited

UNITED STATES PATENTS

| 1,421,059 | 6/1922 | Bashara | 70/182 X |
| 1,650,578 | 11/1927 | Wyman | 70/164 |
| 1,818,373 | 8/1931 | Beach | 60/232 X |
| 1,825,726 | 10/1931 | Gredell | 70/232 |
| 2,171,664 | 9/1939 | McFarland | 70/DIG. 57 X |
| 2,542,332 | 2/1951 | Holmsten | 70/DIG. 57 X |
| 3,667,259 | 6/1972 | Reque et al. | 70/14 |
| 3,743,224 | 7/1973 | Singer et al. | 248/203 X |
| 3,899,905 | 8/1975 | Walters | 70/97 X |

FOREIGN PATENTS OR APPLICATIONS 267,892  9/1929  Italy ...................................... 70/232

Primary Examiner—Ramon S. Britts
Assistant Examiner—William E. Lyddane
Attorney, Agent, or Firm—Maleson, Kimmelman and Ratner

[57] ABSTRACT

A shield lock assembly for shielding securing members engaging a rigid frame. The lock assembly includes a shield member which is secured to a rigid frame through a fastener. The shield member further passes over and covers at least one of the securing members. A lock housing is movably mounted to the shield member and is displaceable to a first locking position which covers the fastener to prevent disengagement of the fastener from the rigid frame. The lock housing is movable to a second unlocking position which exposes the fastener and allows disengagement of the fastener from the rigid frame to permit removal of the shield member thus exposing the covered securing members.

11 Claims, 11 Drawing Figures

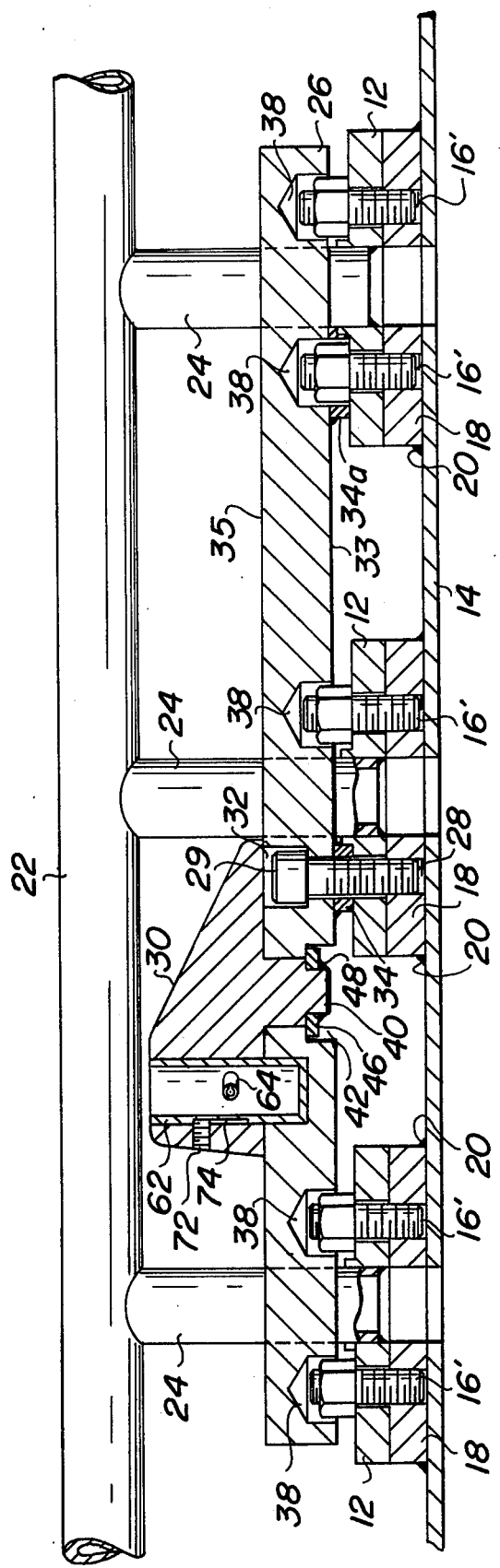

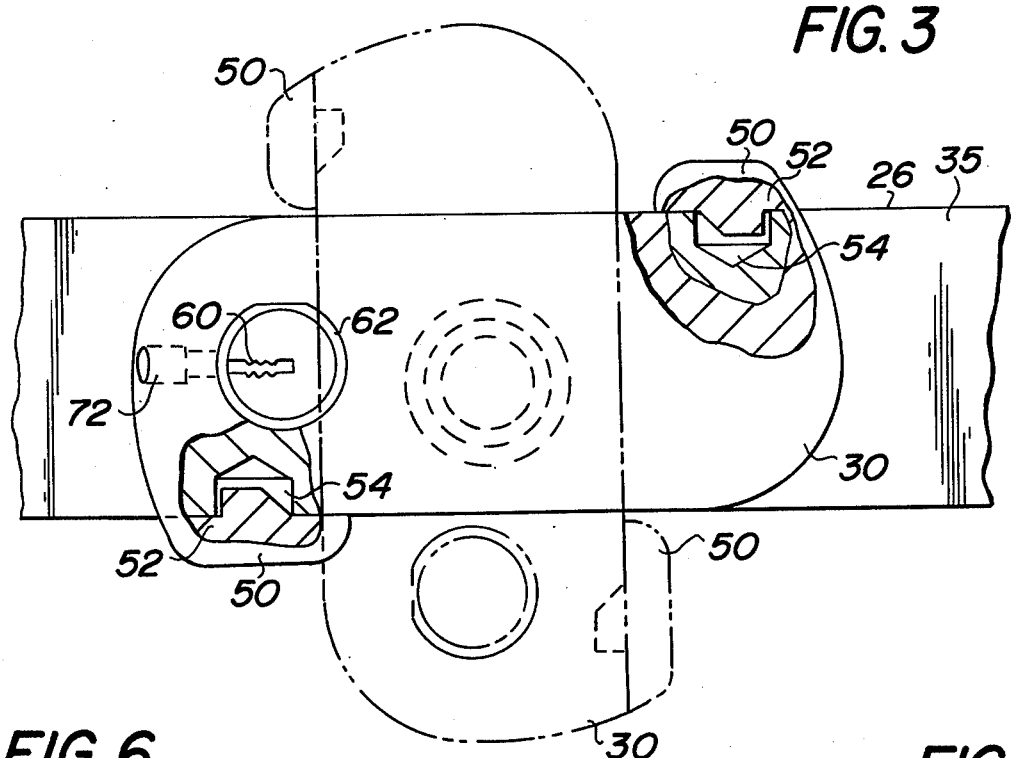
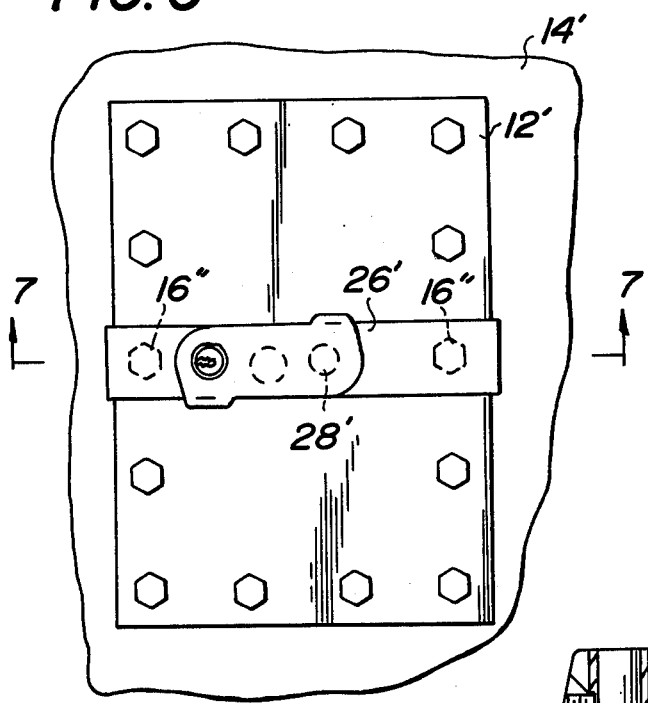
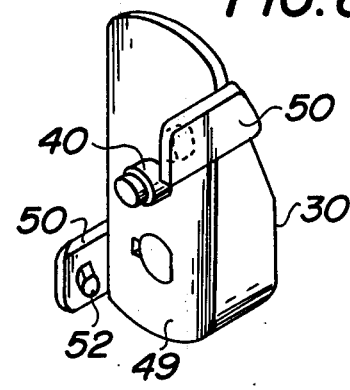
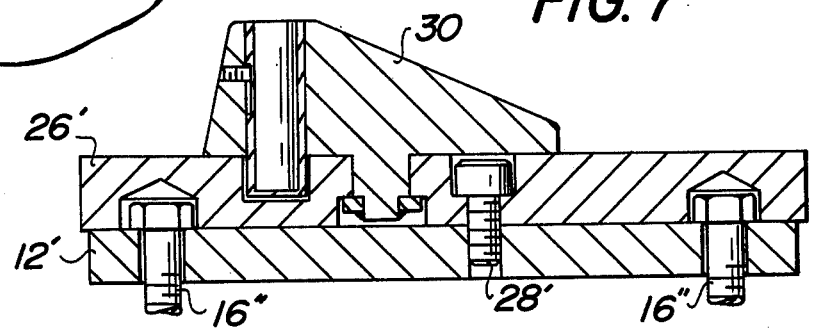

SHIELD LOCK ASSEMBLY

BACKGROUND OF THE INVENTION

A. Field of the Invention

This invention pertains to the field of locking assemblies. In particular, this invention relates to the field of lock assemblies which shield securing members mounted to a rigid frame.

B. Prior Art

Protecting openings that lead to secure areas have been a continuing problem and have had many differing solutions. The problem is more severe where the opening or areas to be protected is of a vulnerable high security nature. For example, the opening may be covered by a bolted down lid or hatch cover of the type which is removable for inspection or the type through which fluid flows. A specific security problem has been encountered where hatch covers are used to cover manifold openings used in the distribution of lubricating oil to turbine transmission or gear assemblies on board ship. These covers are accessible to shipboard personnel and may be easily opened by unauthorized persons who may maliciously throw in pieces of metal which would cause extensive damage to the extremely costly equipment. Prior lock assemblies have left much to be desired in a simple yet high security system to guard such vulnerable equipment.

SUMMARY OF THE INVENTION

A shield lock assembly for shielding securing members engaging a rigid frame. The shield lock assembly includes a shield member secured to the rigid frame at least at one predetermined location for shielding at least one of the securing members. The assembly further includes a lock housing movably mounted to the shield member for displacement to at least (1) a first locking position covering the predetermined location, and (2) a second unlocking position for exposing the predetermined location.

BRIEF DESCRIPTION OF THE DRAWINGS

FIG. 2 is a cross sectional view of the shield lock assembly taken along the section lines 2—2 of FIG. 1;

FIG. 3 is a plane view of the lock housing showing both the first locking position and the second unlocking position taken with respect to the shield member;

FIG. 5. is a plane view of the shield lock assembly utilizing two lock housings mounted on one shield member;

FIG. 6 is a plane view of an embodiment of the shield lock assembly showing the shield member mounted on a cover plate;

FIG. 7 is a cross sectional view of the embodiment of the invention as shown in FIG. 6 and taken along the section lines 7—7 of FIG. 6;

FIG. 8 is a perspective view of the lock housing used in the shield lock assembly;

DETAILED DESCRIPTION

Figure 1:
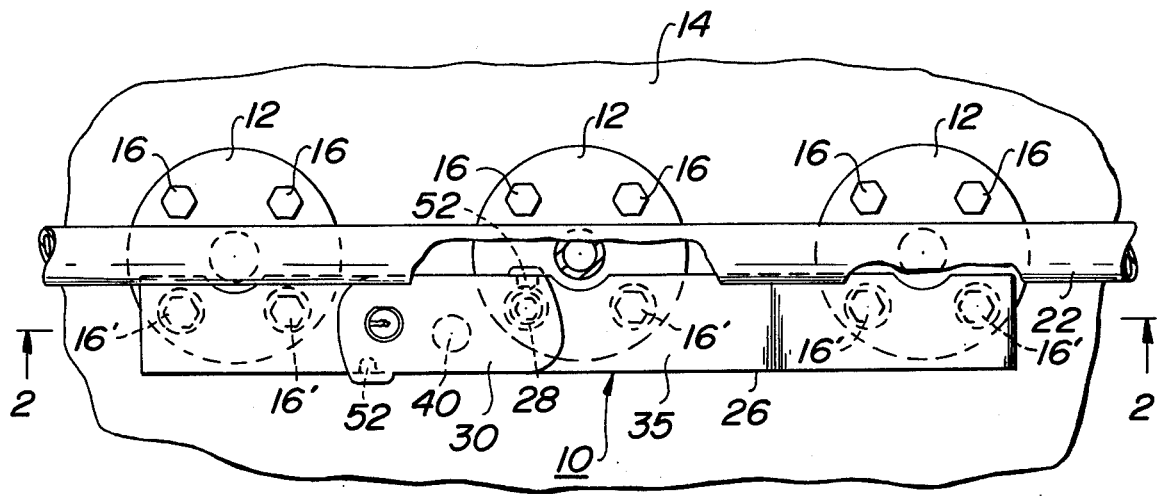
FIG. 1 is a plane view of the shield lock assembly.

Referring now to FIGS. 1-5, there is shown a shield lock assembly 10 for securing manifold hatch covers 12 which are secured to frame 14 by securing members 16, 16'. Frame 14 may form a housing for a turbine transmission, gear box or similar vulnerable equipment. A conduit 22 is coupled by way of connecting lines 24 through central openings in each of covers 12 to provide for manifold distribution of oil from a source through conduit 22 and lines 24 into housing 14. Lines 24 may be secured to covers 12 in conventional manner.

Assembly 10 is utilized to guard against disengagement of securing members 16' from frame 14, and as will be shown, securing members 16' are used to secure hatch covers 12 to frame 14. Thus, by guarding against removal of members 16', it is seen that covers 12 may be maintained in fixed securement to rigid frame 14. Shield lock assembly 10 further includes a multiplicity of securement modes for optimally maximizing the time of entry necessitated when unauthorized personnel attempt to open or otherwise surreptitiously remove securing members 16' to open covers 12 from rigid frame 14.

In overall concept, shield lock assembly 10 includes shield or strap member 26 which is secured to rigid frame 14 at least at one predetermind location as defined by fastener 28 as is shown in FIG. 2. Thus, shield member 26 is positionally secured in a manner in which at least one of securing members 16' is shielded against external attack.

Figure 4:
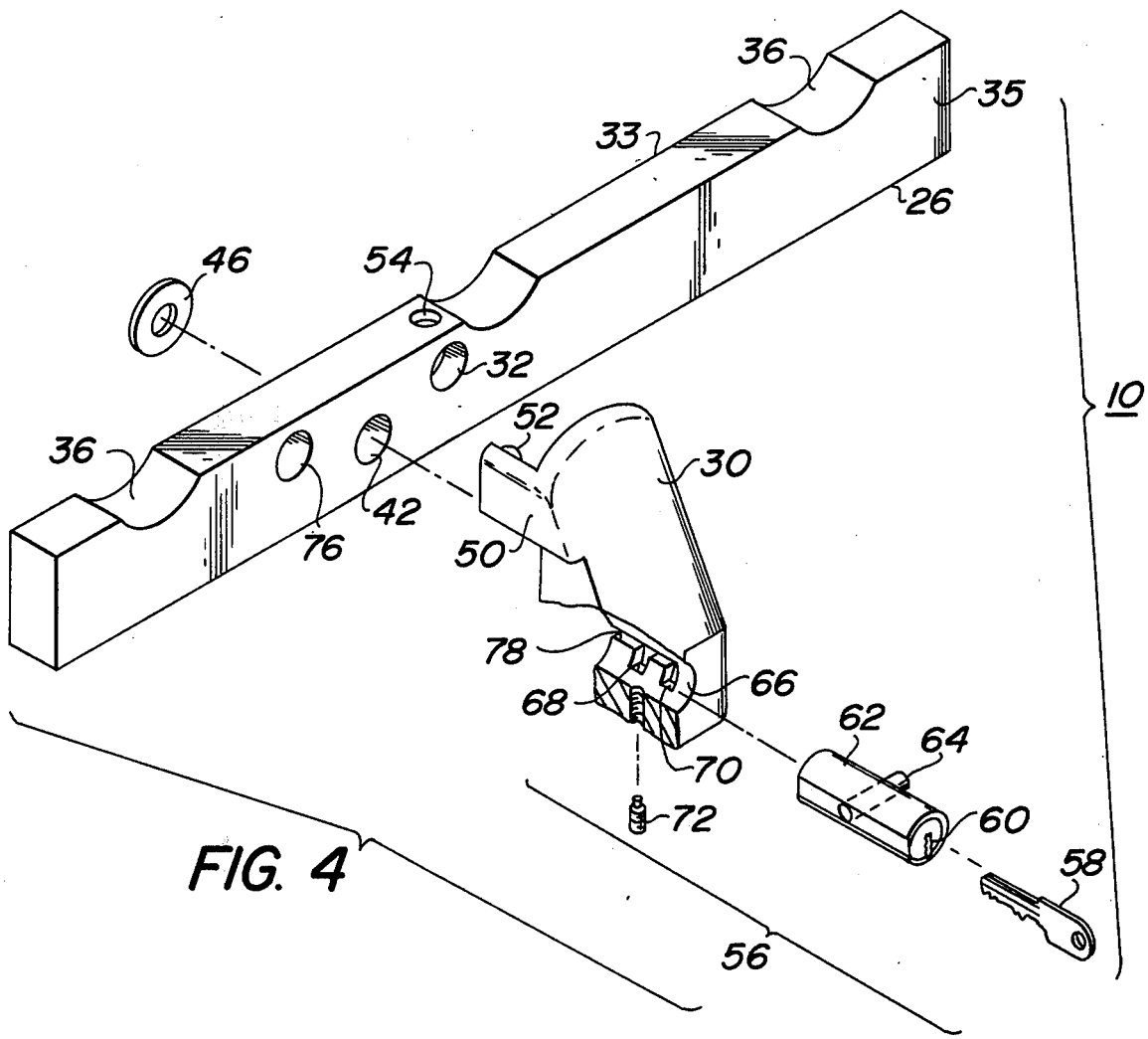
FIG. 4 is a perspective view of the shield lock assembly.

Referring now to FIGS. 1, 2 and 4, it is seen that shield 26 extends in a predetermined direction and is contoured to pass over at least a portion of each cover 12 which may be intended to be secured to manifold 14. Shield 26 is mounted over at least one securing member 16' on each of covers 12 thus sandwiching the securement member 16' between shield 26 and rigid frame or manifold 14. Threaded disengagement of each of securing members 16' is predicated upon the initial removal of shield 26 from frame 14. As can be seen, when shield 26 is positiionally placed over covers 12 as is shown in FIG. 1, particular securing members 16 may be threadedly disengaged from manifold 14. However, securing members 16' are not exposed to view and cannot be removably displaced from manifold 14 without the removal of shield 26.

Strap or shield member 26 includes a plurality of recesses 38 formed within shield lower surface 33 as is clearly shown in FIG. 2. Recesses 38 are of sufficient diameter such that securing members 16' may at least be partially inserted therein. In general, recesses 38 permit securing members 16' to be maintained at least partially within shield member 26 to prevent access to members 16' from external attack. Recesses 38 may be formed of sufficient depth such that the clearance between lower surface 33 of shield 26 and the upper surface of covers 12 is minimized thereby lowering the possibility of the insertion of a wrench or other removal device within the clearance. It will be understood that as illustrated, each of the securing members 16' comprises a bolt extending from plate 18 with the bolt being threadedly engaged by a nut received within recess 38. It is in this manner that assembly 10 guards against the turning of the nut and the cutting of the bolt. It will also be understood that some or all of members 16' may be bolts whose heads are received within recesses 38.

Fastener through opening 32 forms a through passage of shield member 26 and defines the predetermined location of fastener 28. As is seen, fastener 28 passes through strap member 26, cover plate 12, and into lower cover member plates 18 as is shown in FIG. 2. Lower cover member plates 18 are secured to rigid frame 14 in rigid constrainment and for the purposes of the inventive concept may be considered as part of rigid frame 14. Thus, in this manner, fastener 28 secures shield member 26 to frame or housing 14. It will be noted, that fastener head 29 when inserted within through opening 32 lies below upper surface 35 of shield 26. As will be seen in following paragraphs, the clearance between as upper surface of fastener head 29 and shield surface 35 permits rotative movement of lock housing 30 to a position where fastener 28 is completely covered from external view. Additionally, it will be noted that fastener 28 may be a cap screw adapted to be removed only through use of an Allen wrench which would in itself increase the time for unauthorized removal of shield lock assembly 10 in that once lock housing 30 is removed, further removal of fastener 28 would be predicated upon the use of a particular type of wrench mechanism.

Thus, as has been described, covers 12 may be mounted to rigid frame 14 through a plurality of securing members 16, 16'. Securing members or bolts 16, 16' are mounted on covers 12 in some predetermined pattern and threadedly engaged as well as passed through covers 12 into threaded securement with lower cover members plates 18. Thus, covers 12 are then fixedly secured through threaded engagement of bolts 16, 16' to lower cover plate 18. The lower cover plates 18 are welded as is shown at weld areas 20 or otherwise fixedly secured to housing or frame 14. It is to be understood that covers 12 may interface directly with frame 14 through engagement of securing members 16, 16' with the important fact being that covers 12 be mounted or otherwise fastened to rigid frame 14.

As shown in FIG. 4, shield 26 may include a plurality of partial cut-out areas 36 which are contoured in a manner to permit passage around each of connecting lines 24. Thus, shield member 26 may be inserted into place over securing members 16' in a manner such that there is no interference with conduit 22 of lines 24. Also, it will be noted that when shield 26 is positionally placed over securing members 16' there may be a tendency for shield 26 to be inclined in one direction or another. In order to maintain shield 26 in a generally horizontal plane and provide a flat connection with covers 12 when in position as is shown in FIG. 2, a number of displacement elements such as washers 34, 34a may be interplaced between shield 26 and upper surfaces of cover 12.

In order to protect fastener 28 from unauthorized threaded disengagement with cover 12 or rigid frame 14, there is provided lock housing 30 which is movably mounted to sheild member 26 for displacement of purposes. Lock housing 30 is movable to a first locking position defined by the darkened lines of FIG. 3 in order to cover the predetermined location of fastener 28. Additionally, lock housing 30 is movable to a second locking position for exposing fastener 28 as is shown in the phantom line construction of FIG. 3. Lock housing 30 is pivotally secured to upper surface 35 of shield 26 for cyclical displacement of housing 30 between the first locking and second unlocking positions as is herein defined.

Referring now to FIGS. 4 and 8, the pivoting action of housing 30 is provided by pivot shaft 40 extending from a lower surface of a lock housing 30 which is insertable within pivot shaft through opening 42. Shaft 40 has a diameter substantially equal to but slightly less than opening 42 to permit rotation of housing 30 with respect to strap member 26 in interfacing contract with shield upper surface 35. In order to provide relative rotative movement of housing 30 with respect to member 26 but at the same time maintaining relative securement therebetween, there is provided pivot washer 46 which is mounted to pivot shaft 40 at an under surface of strap member 26 as is shown in FIG. 2. Washer 46 may then in turn be welded or otherwise secured to shaft 40 at pivot weld area 48 to prevent removal of lock housing 30 from shield member 26. Thus, through this combined set of elements, there is seen that lock housing 30 may be rotatably moved around pivot shaft opening 42 but remaining in relative securement with shield 26 and not displaceable therefrom.

Lock housing 30 further includes a pair of sidewalls 50 which generally extend in a direction perpendicular to the plane defining lower surface 49 of housing 30. Sidewalls 50 pass over opposing side surface of shield member 26 and include tang members 52 which extend in a direction generally normal to the general extension of each of sidewalls 50. Tang members 52 define shield engagement means for releasably engaging shield member 26 within opposing side surface thereof when lock housing 30 is displaced into the first locking position. As is seen in FIGS. 1 and 3, tang members 52 are insertable in respect to strap or shield recesses 54 when housing 30 has been rotatably displaced to the locking position where housing 30 is covering fastener 28. Thus, the insertion of tang members 52 into respective shield recesses 54 increases the shear load restraining capability of shield lock assembly 30. Tang members 52 when inserted into recesses 54 essentially act as dead bolt mechanism whereby a tool being inserted into an interface clearance between lock housing 30 and strap member or shield 26 must shear the tang members 52 from within recesses 54. This merely adds to the load restraining capability of the overall assembly lock 10 and increases the time necessary for unauthorized entry into rigid frame 14.

To maintain lock housing 30 in the first locking position as defined in FIG. 3, there is provided bar lock mechanism 56 which operates in substantially the same way as that of the bar lock mechanism shown in my copending patent application Ser. No. 403,460 filed on Oct. 4, 1973 now U.S. Pat. No. 3,921,422. In brief, bar lock mechanism 56 is operable through insertion of key 58 into key insert opening 60 and rotation thereof through a predetermined angular displacement. Angular displacement of key 58 creates a responsive angular displacement of locking pin 64 which is movable with respect to locking tube 62. Locking tube 62 is longitudinally insertable within housing opening 66 as is shown in FIG. 4. Longitudinal movement of locking tube 62 is provided by insertion of set screw 72 within set screw channel 74 as is shown in FIG. 7. Locking pin 64 is then angularly movable into first lock groove 68 or second lock groove 70 as a function of the angular displacement of key 58 when inserted within opening 60.

Locking tube 62 has a longitudinal extension length sufficient that when pin 64 is aligned with first lock groove 68, locking tube 62 passes internal to shield lock recess 76. Thus, when housing 30 is in the first locking position, tube 62 is extended into recess 76 and pin 64 is rotated into groove 68. In this manner, fastener 28 is covered by lock housing 30 which is blocked to shield 26. In order to expose fastener 28 to permit threaded disengagement, pin 64 is rotated into alignment with longitudinally directed channel 78. Locking tube 62 is then longitudinally moved out of engagement with lock recess 76 until pin 64 is aligned with groove 70. Pin 64 may then be inserted into groove 70 and key 58 removed from insert 60. In this manner, locking tube 62 is removed from shield lock recess 76 and lock housing 30 is free to rotate respective with shield upper surface 35. Thus lock housing 30 may be rotated to the second unlocking position where fastener 28 is exposed and is free to be threadedly disengaged from rigid frame 14.

An embodiment of the instant invention is shown in FIGS. 6 and 7 in which there is secured a hatch cover 12' on housing or frame 14. Cover 12' may be of the type which is removable in order to inspect a transmission or gear box within the housing. To secure cover 12' lock housing 30 is pivotally movable on shield member 26' which covers a pair of securing members 16" which are mounted to housing 14' through cover plate 12'. In this embodiment, strap member or shield 26' is removable from cover plate 12' by rotation of lock housing 30 to the second unlocked position thus exposing faterner 28'. Fastener 28' extends between shield 26' and cover plate 12'. As is seen, strap member 26' interfaces with cover plate 12' in a substantially contiguous manner and in this way minimizes the possibility of a wrench being inserted between shield 26' and plate 12'. As has been previously described, removal of cover plate 12' from rigid frame dictates the removal of the bar mechanism, movement of lock housing 30 to a position exposing fastener 28', threaded disengagement of fastener 28' and subsequent removal of strap 26' to expose securing members 16".

Figure 9:
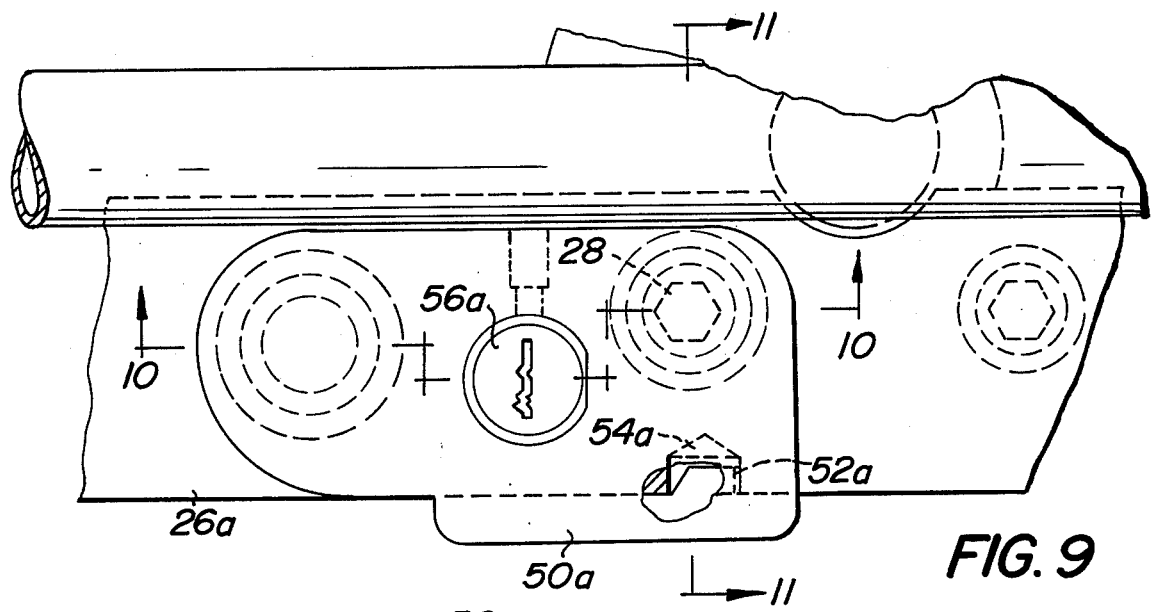
FIG. 9 is a plane view of a further embodiment of the shield lock assembly having a single side member.
Figure 10:
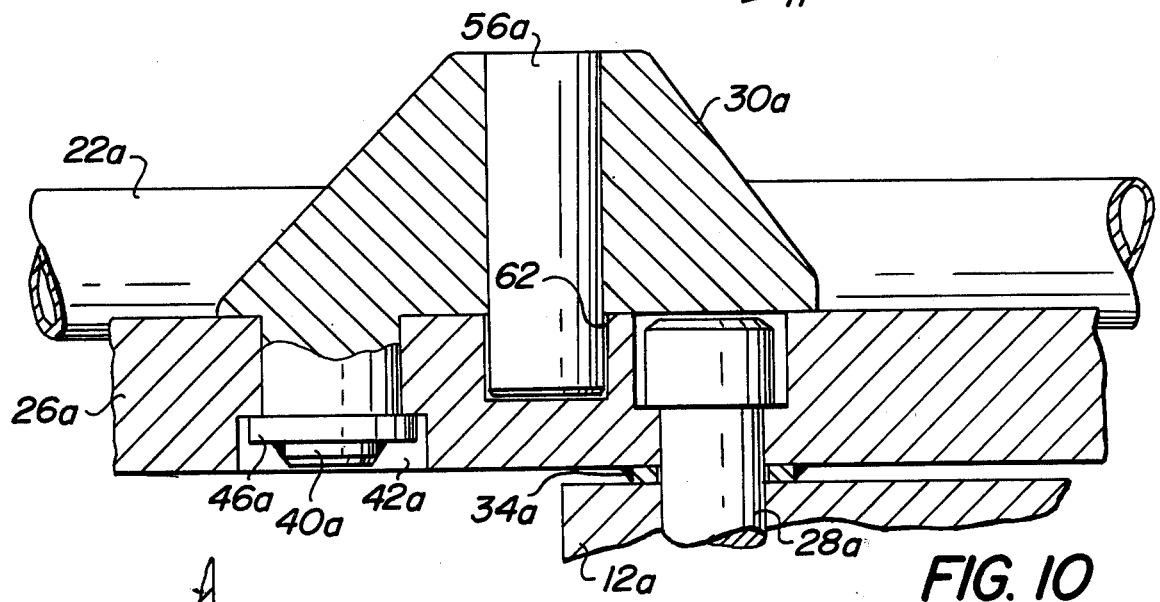
FIG. 10 is a cross sectional view of the further embodiment shown in FIG. 9 and taken along section lines 10—10 of FIG. 9.
Figure 11:
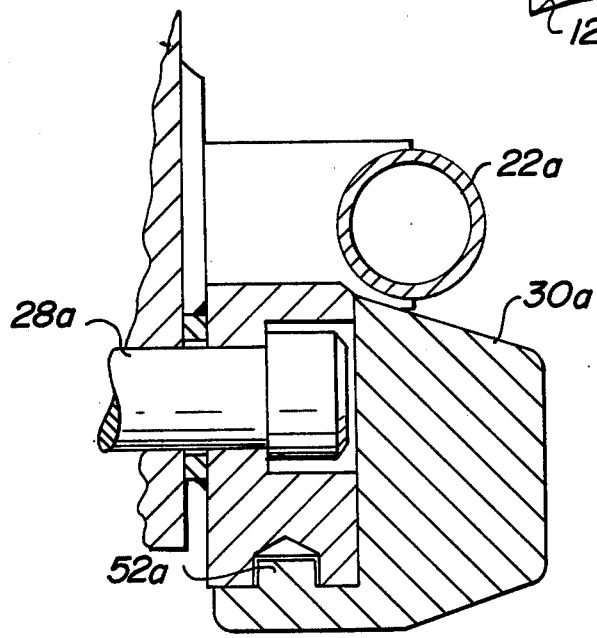
FIG. 11 is a cross sectional view of the further embodiment shown in FIG. 9 and taken along section lines 11—11 of FIG. 9.

A further embodiment of the present invention is shown in FIGS. 9-11 in which lock housing 30a has only a single flap or housing side member 50a. The double side members 50 shown in FIGS. 1-8 would not be suitable for this embodiment since conduit 22 in FIGS. 9-11 is substantially lower than in the example shown in FIG. 2. Thus, a second side member would be unable to move underneath and clear conduit 22a in the manner that side member 50 clears conduit 22 in FIG. 2.

In the embodiment of FIGS. 9-11, bar lock mechanism 56a is insertable within a housing opening formed about midway between the ends of housing 30a. This is to be compared with housing 30 in which housing opening 66 receiving mechanism 56 is adjacent one end of the housing. Further, side member 50a is made substantially longer than member 50 in the longitudinal direction of housing 30a in order to protect locking tube 62a of bar lock mechanism 56a from being cut by means of a saw blade passed between strap member 26a and housing 30a. Further, pivot shaft 40a pivots within pivot shaft opening 42a to provide an off center pivot point which is adjacent an end of housing 30a as compared with substantially central pivot point of housing 30. This off center pivot is required in order to operate within the restrictions of the manifold and manifold conduit 22a shown in FIGS. 9-11.

As in housing 30, lock housing 30a has a tang member 52a which is insertable within recess 54a when the housing is in its locked position in which side member 50a is in interfacing contact with strap 26a. In this locked position, fastener 28a is protected from unauthorized disengagement thereby to protect manifold cover 12a.

What is claimed is:

1. A shield lock assembly for shielding at least one securing member engaging a rigid frame comprising:
   a. a shield member, fastener means separate from said securing member for fastening said shield member to said rigid frame for shielding said securing member, said shield member being secured to said rigid frame only by said fastener means,
   b. a lock housing having a concealed pivot member received in said shield member for rotative displacement of said lock housing to at least (1) a first locking position covering said fastener means and (2) a second unlocking position for exposing said fastener means,
   c. said pivot member extending into said shield member in a direction toward said rigid frame and being concealed by said lock housing,
   d. said lock housing having at least one side member extending therefrom adapted for releasable engagement with a side surface of said shield member when said lock housing is in said first locking position, and
   e. lock means cooperating with said lock housing to lock said lock housing in said first locking position.

2. The shield lock assembly as recited in claim 1 wherein said lock means comprises bar lock means moveably actuatable within said lock housing and insertable within said shield member when said lock housing is in said first locking position.

3. The shield lock assembly as recited in claim 29 where said bar lock means includes means for locking said bar lock means to said lock housing when said lock housing is removed from said first locking position.

4. The shield lock assembly as recited in claim 1 where said securing member rigidly contrains a cover plate between said securing member and said rigid frame.

5. The shield lock assembly of claim 1 in which said side member extends in the same direction as said pivot member and passes over said side surface of said shield member when said lock housing is in said first locking position.

6. The shield lock assembly of claim 5 in which said side member includes at least one tang member for insertion into a recess formed within said side surface of said shield member when said lock housing is in said first locking position.

7. The shield lock assembly as recited in claim 6 where at least one of said securing members is sandwiched between said shield member and said rigid frame.

8. The shield lock assembly as recited in claim 6 where said securing member is at least partially insertable within said shield member for minimizing exposed surfaces of said securing member to external attack.

9. The shield lock assembly as recited in claim 6 wherein said lock means comprises bar lock means moveably actuatable within said lock housing and at least partially insertable within said shield member when said lock housing is in said first locking position for preventing movement of said lock housing with respect to said shield member.

10. The shield lock assembly of claim 1 in which said lock housing has a pair of side members extending therefrom adapted for releasable engagement with opposing side surfaces of said shield member when said lock housing is in said first locking position, each of said side members having at least one tang member for insertion into recesses formed within said opposing side surfaces.

11. The shield lock assembly of claim 10 in which said concealed pivot member is pivotally secured to said shield member on the side of said shield member adjacent to said rigid frame.

* * * * *

UNITED STATES PATENT OFFICE
CERTIFICATE OF CORRECTION

PATENT NO. : 4,022,037
DATED : May 10, 1977
INVENTOR(S) : Russell W. Walters

It is certified that error appears in the above–identified patent and that said Letters Patent are hereby corrected as shown below:

In claim 3, line 1, change "29" to --2--.

Signed and Sealed this ninth Day of August 1977

[SEAL]

Attest:

RUTH C. MASON
*Attesting Officer*

C. MARSHALL DANN
*Commissioner of Patents and Trademarks*